Jan. 8, 1946.  E. WILDHABER  2,392,441
GEARING
Filed Aug. 31, 1943  3 Sheets-Sheet 1

Inventor
ERNEST WILDHABER
By
Attorney

Jan. 8, 1946.   E. WILDHABER   2,392,441
GEARING
Filed Aug. 31, 1943   3 Sheets-Sheet 2

Inventor
ERNEST WILDHABER
By
Attorney

Jan. 8, 1946. E. WILDHABER 2,392,441
GEARING
Filed Aug. 31, 1943 3 Sheets-Sheet 3

Inventor
ERNEST WILDHABER
By
Attorney

Patented Jan. 8, 1946

2,392,441

UNITED STATES PATENT OFFICE 2,392,441

GEARING

Ernest Wildhaber, Brighton, N. Y., assignor to Gleason Works, Rochester, N. Y., a corporation of New York Application August 31, 1943, Serial No. 500,671

7 Claims. (Cl. 74—315)

The present invention relates to differential gearing such as is used in automotive drives, and particularly to differential gearing of the varying leverage type.

In an automobile equipped with a gear differential of the conventional type having uniform motion gears, if one wheel gets into the mud or on an icy spot, it will start to spin or race with the result that the driving power transmitted to the other wheel will be considerably diminished and under bad mud or ice conditions there may not be enough traction to move the vehicle. For this reason, differentials of the varying leverage type have come into use, especially on trucks and tractors where it is important to provide some means for preventing complete loss of traction when one of the drive wheels of the vehicle slips. In a differential of the varying leverage type, if the tractive power of one wheel is diminished for any reason, the power transmitted to the other wheel is periodically increased. This periodic increase in power is intended to provide enough traction to enable the vehicle to pull itself out of the mud or off of the ice.

Differential gearing of the varying leverage type has heretofore been made in two principal forms. In one form, the teeth of the gears, both of the side gears and the planet pinions, are of special shape, although all of the teeth of each gear are alike and are equally spaced about the axis of the gear. In the other form, the planet pinions are mounted on eccentric axes and the side gears have a lobulate pitch surface, conforming to the eccentricity of the pinions, and their teeth differ from one another progressively around the gears.

The second type of varying leverage differential permits of a large variation of leverage, but the cycle of variation is slower than in the first described type. With the second type, only one cycle of leverage variation takes place per revolution of a planet pinion, whereas in the first described type, there are as many cycles per revolution of a planet pinion as there are teeth in the pinion. Both types of varying leverage differential gearing require, however, special machinery for cutting the teeth, and in both types, moreover, the gear cutting processes are slow as compared with the processes of cutting standard uniform motion differential gears. The first type furthermore is limited to the use of unduly low numbers of teeth in both side gears and pinions and, in addition, the teeth of both side gears and pinions contain profile portions which are subject to severe wear. In the second described type, the side gears have, as stated, a lobulate construction, requiring not only special machinery for cutting the teeth but special machinery to produce the blanks. Moreover, this type is limited to very few ratios of tooth numbers of side gears to planet pinions, for the number of teeth in the side gears must always be a multiple of or the same as the number of teeth in the pinions. Ordinarily, therefore, a two to one ratio is used in the second type.

One object of the present invention is to provide varying leverage differential gearing in which the disadvantages of both known types of such gearing may be avoided while retaining their prime advantages.

Another object of the invention is to provide differential gearing of the varying leverage type which can be cut without special machinery and just as fast as standard uniform-motion differential gearing.

A further object of the invention is to provide differential gearing in which the varying leverage effect can be obtained without resorting to special designs of gear teeth but in which the gears can have the same tooth shapes as gears of standard uniform-motion differentials.

Another object of the invention is to provide a varying-leverage type differential in which variation in leverage may be obtained by other means than the shape of the gear teeth or the construction of the gears themselves.

In one modification, a further object of the invention is to provide a varying leverage differential which has the advantages of the second above described form of such differential, namely, large variation in leverage and a cycle per revolution of the planet pinions, but in which these advantages may be realized with gears having standard uniform motion tooth shapes and with gears, also, which are not restricted as regards the gear ratio employable.

In another modification, still another object of the invention is to provide a varying leverage differential in which gears having teeth of standard uniform motion shape may be employed, and in which the variation in leverage may occur a number of times per revolution of a planet pinion.

Other objects of the invention will be apparent hereinafter from the specification, when read in conjunction with the accompanying drawings, and from the recital of the appended claims.

In a differential constructed according to the present invention, the gears and the pinions used have teeth of the same configuration as the teeth of any ordinary uniform-motion differential and the gears and pinions can be cut on the same machines and in the same way and with the same speed as the gears and pinions of any standard uniform-motion differential. In the differential of the present invention, however, means is provided for rolling the planet pinions back and forth over the side gears, as they revolve, so that the pinions will alternately increase and decrease the power applied to each side gear. The invention is shown as applied to a bevel gear differential and several different embodiments of the invention are shown in the accompanying drawings.

In one embodiment, each planet pinion has a hub projection formed thereon which engages in a parallel sided slot that is provided in the differential housing and that extends in the direction of the axis of the side gears. The hub projection may be in the form of an eccentric or a cam of any suitable shape. When the pinion is rotated, the hub projection travels back and forth in the slot in the differential housing, forcing the pinion to roll back and forth about the axis of the side gears of the differential. Thus, the pinion alternately adds to and subtracts from the rotation of the side gear and thus, the power applied by the side gears to each of the drive wheels of the vehicle is alternately increased and decreased.

In another embodiment of the invention, the pinion is provided with a square hole and is mounted in the differential housing by means of a pin that engages in this hole. The portion of the pin, which extends within the hole, is cam-shaped and is so formed that again as the pinion rotates on its axis it is rocked back and forth over the side gears. Thus, again, power is alternately increased and decreased to the respective side gears.

Figure 9:
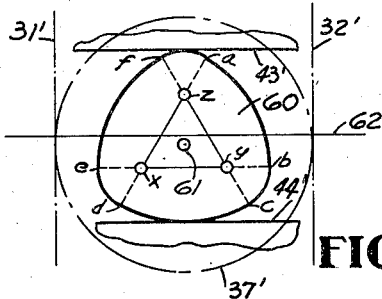
Figure 10:
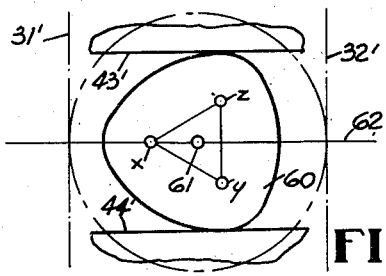
Figure 11:
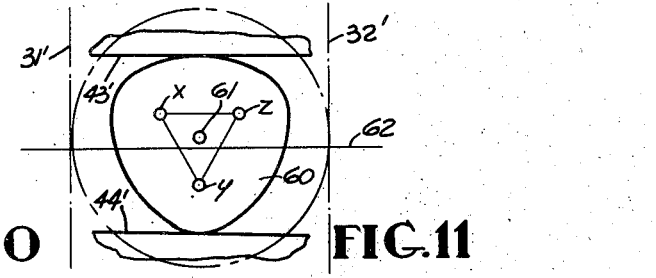
Figure 12:
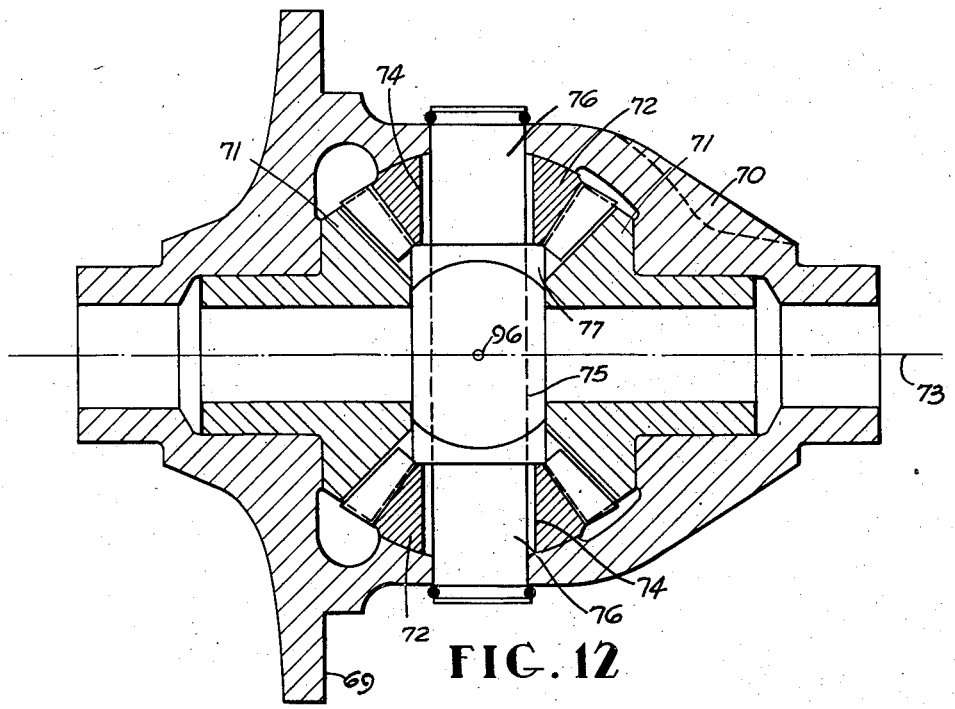

Figs. 4 to 8 inclusive are diagrammatic views illustrating the operation of this embodiment of the invention, and showing various positions of a planet pinion for one revolution of the pinion;

Figs. 9 to 11 inclusive are diagrammatic views showing a modification of the invention in which the variation in leverage takes place a plurality of times in a revolution of a planet pinion;

Fig. 12 is an axial section through a differential constructed according to a still further embodiment of the invention; and Figs. 13 to 16 inclusive are diagrammatic views illustrating the construction and operation of the embodiment shown in Fig. 12.

Figure 1:
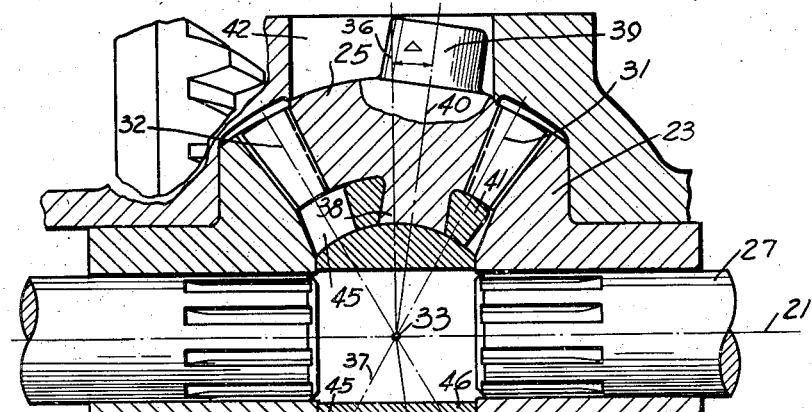
Fig. 1 is an axial sectional view through a differential carrier constructed according to one embodiment of this invention, the drive gear of the differential housing being shown fragmentarily and broken away and one of the planet pinions of the differential being shown in elevation.
Figure 3:
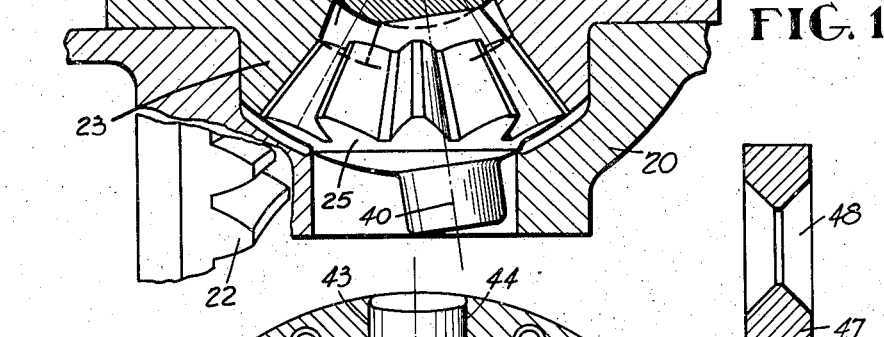
Fig. 3 is a section on the line 3—3 of Fig. 2.
Figure 2:
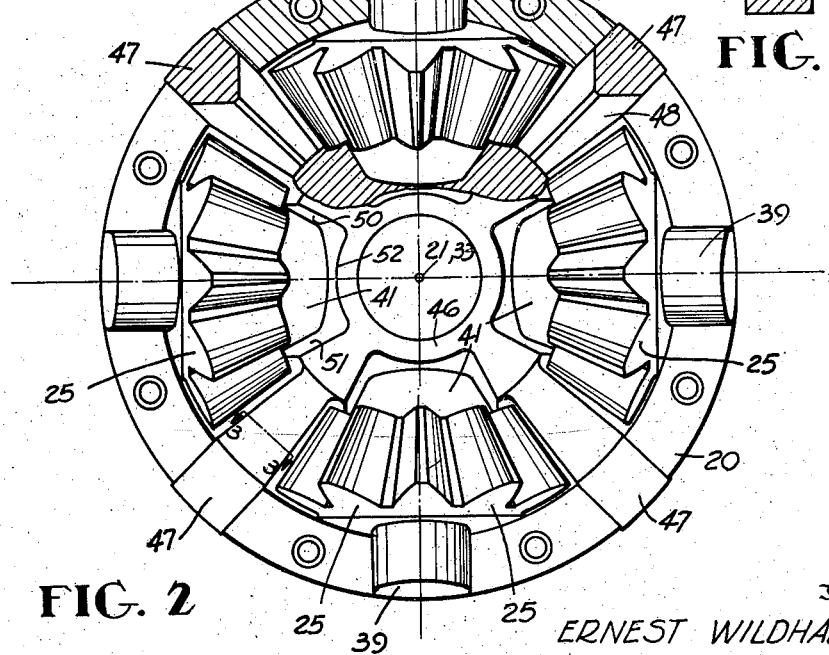
Fig. 2 is a section through the differential housing taken at right angles to the view of Fig. 1 but with the pinion shown in elevation.

In Figs. 1 to 3 inclusive, 20 denotes an automotive differential housing which is mounted in the usual manner for rotation about the axis 21 of the rear axle of the automotive vehicle. The differential housing is adapted to be driven in the usual manner to drive the rear wheels of the vehicle, as through a bevel or hypoid pinion not shown and a bevel or hypoid gear 22 which meshes with the pinion and which is secured to the differential housing.

The differential itself comprises the two bevel side gears 23, and, in the instance shown, the four planetary bevel pinions 25. The side gears 23 have splined connections with the two axle shafts 27 on which the rear wheels of the vehicle are mounted. The side gears 23 are of the same construction as the bevel side gears of a standard, uniform-motion type differential and they are mounted in the usual manner coaxially of the axis 21 of the axle. They have conical pitch surfaces 31 and 32, respectively, converging in a common apex 33, and their teeth 30 may have side surfaces of involute or of any other suitable profile shape and are uniformly spaced from one another about the gear axis 21.

The pinions 25 also have teeth of standard shape. The teeth 35 of each pinion are uniformly spaced about a common geometric axis 36 and the pinions are mounted so that the apices of their pitch surfaces 37 coincide with the common apex 33. The pinions differ from standard bevel pinions, however, in that instead of being mounted to rotate on shafts coaxial with their geometric axes 36, each is provided with front and rear eccentric hub projections 38 and 39 whose common axis 40 passes through the common apex 33 but is inclined to the geometric axis 36 at an angle Δ.

The front hub projection 38 of each pinion is mounted in a roller 41 that has a conical outside surface whose apex coincides with the apex 33. The rear hub projection 39 of each pinion engages in a slot 42 formed in the housing 20 and having straight parallel sides 43 and 44. The sides 43 and 44 are planes parallel to each other and parallel to the axis 21 of the differential housing.

Each conical roller 41 engages in an arcuate slot 45 formed in a spider 46 whose axis coincides with the axis 21 of the differential. This spider is provided with four equally spaced arms 47 which are secured in suitable slots formed in the two halves of the differential housing 20 and which serve to lock the spider against rotation relative to the differential housing. Each of the arms 47 has a slot 48 extending through it which is shaped to have its sides converging toward a point at the center of the slot as shown in Fig. 3. These slots are provided to allow free movement of the pinions without interference from the arms as the pinions rotate and are influenced in their rotation by the eccentric hub projections 38 and 39.

The slots 45 in which the rollers 41 engage have straight sides 50 and 51 which converge to the apex 33 and match the sides of the rollers 41. The bottom 52 of each slot is an arcuate surface concentric to the apex 33. Thus, the slots 42 and 45 permit the axes 40 of the hub projections to rock back and forth about the apex 33 in a plane containing the axis 21 of the differential, as the pinions rotate.

The differential operates in the same way as a standard differential when the car is moving straight ahead. The pinions 25 will then revolve with the housing 20 without rotating about their axes 36, with the result that the two side gears 23 will be driven at equal speeds and drive the two axle shafts 27 at equal speeds. When one of the wheels of the vehicle slips, however, and there is unequal traction on the two wheels, the pinions 25 will rotate on their axes 36. Then the shaft projections 39 and conical rollers 41 will act like conical eccentrics or cams. Since these conical eccentrics or cams are constrained by the straight parallel sides of the slots 42 and 45 to move in an axial plane about apex 33 and since the two side gears 23 maintain the axes 36 of the pinions in a plane perpendicular to the axis 21, the pinions 25 will themselves tend to move bodily alternately forward and back about the axis 21 of the differential housing so as to move about the axis 21 alternately with and against the rotation of the housing. Thereby the power applied to each of the side gears 23 will be alternately increased and decreased. In this way, the traction on the wheel, which is not slipping, is periodically varied to assist it to pull the vehicle out of the mud or snow or off the ice.

In the embodiment of the invention shown in Fig. 1 only the forward hub projection 38 of each pinion is mounted in a conical roller 41. It will be understood, however, that the rear hub projections 39 might also be so mounted if desired.

In the extreme positions shown in Fig. 1, the instantaneous motion is as if each pinion were turning about the axis 40 of the hub projections. These positions give a maximum difference of the amounts of torque transmitted to the two side gears. Assuming that the frictional loss is zero, the amounts transmitted to the two side gears are in the proportion of $$\frac{\sin(\gamma+\Delta)}{\sin(\gamma-\Delta)}$$

where $\gamma$ denotes the pitch angle of the pinion. This expression can be transformed into $$\frac{\sin\gamma\cos\Delta+\cos\gamma\sin\Delta}{\sin\gamma\cos\Delta-\cos\gamma\sin\Delta}=\frac{\tan\gamma+\tan\Delta}{\tan\gamma-\tan\Delta}=\frac{1+\tan\gamma\cot\Delta}{1-\tan\gamma\cot\Delta}$$

If the gear ratio is 9 to 16, for instance, that is, if there are 9 teeth in each of the pinions and 16 teeth in each of the side gears, and $\Delta$ is equal to 8°, the above proportion becomes 1.666. The variation in leverage obtainable, then, with a differential constructed according to the present invention is much more than can be obtained with varying leverage differentials of prior construction where the variation in leverage depends upon the shape of the individual teeth.

Figure 4:
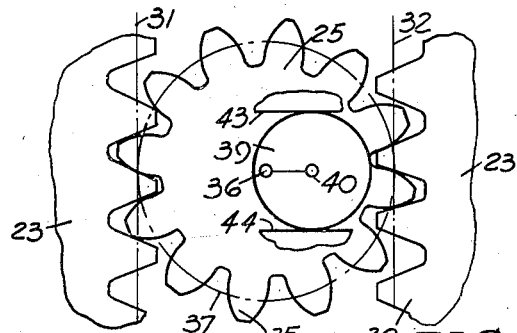

The action of the differential illustrated in Figs. 1 and 2 is further illustrated in Figs. 4 to 7 inclusive. Fig. 4 is a view looking at the large end of of the planetary pinions 25 and showing one position of mesh of the pinion with the side gears 23. In Figs. 5 to 8 inclusive, however, the pinion and gears are represented by their respective pitch surfaces 37, 31, and 32. The contact of the eccentric hub 39 at diametrically opposite sides with the parallel straight sides 43 and 44 of the slot 42 of the differential housing 20 constrains the hub portion 38 to move back and forth longitudinally in this slot, as described, while the double mesh of the pinion 25 with the side gears 23 prevents the center 36 of the pinion from moving longitudinally of the slot and constrains it to move peripherally along the pitch surfaces 31 and 32 of the side gears, thus imparting motion in opposite directions to the side gears. The eccentric 39 through its engagement with the slot 42, in other words, will move the pinion 25 peripherally relative to the housing 20 as if at any one instant the pinion were turning about the axis 40.

Figure 5:
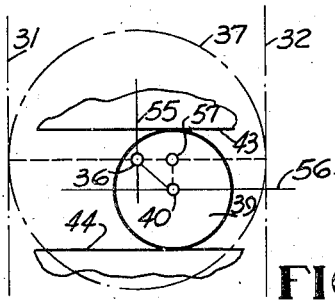

Fig. 5 illustrates a position of the pinion where the eccentric portion 39 has rotated through an angle of 45° from the position shown in Fig. 4. In this rotation, the pinion center 36 has moved peripherally along a line 55 while the center 40 of the eccentric hub portion has moved laterally along the center line 56 of the slot 42. The instantaneous axis 57 of the pinion motion with respect to the differential housing and with respect to the slot 42 is obtained in known manner as the point of intersection of the lines 36—57 and 40—57 drawn perpendicular to the paths 55 and 56 of points 36 and 40, respectively.

Figure 6:
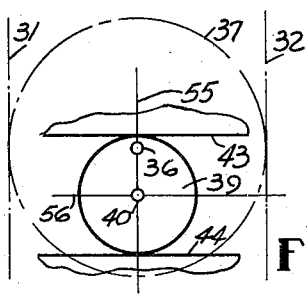
Figure 7:
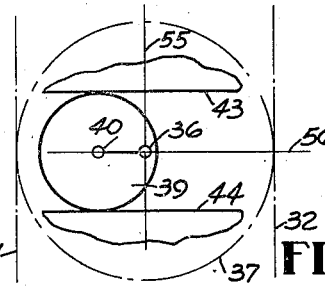
Figure 8:
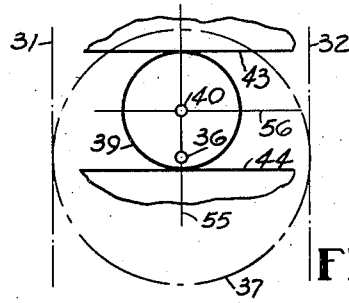

Fig. 6 illustrates the position of the pinion after the eccentric portion 39 has rotated through an angle of 45° from the position shown in Fig. 5. The center 36 of the pinion is here at one extreme position of its movement along the line 55. Fig. 7 shows the position of the pinion after the eccentric has rotated through an angle of 90° from the position shown in Fig. 6. The direction of travel of the pinion center 36 has been reversed and the center 36 has travelled back to a mean position along the line 55. Fig. 8 shows the position of the pinion after the eccentric has rotated through another angle of 90° from the position shown in Fig. 7. Here the center 36 of the pinion has moved to its other extreme position along the line 55. In its further rotation from the position shown in Fig. 8, the pinion will again reverse the direction of its travel along the line 55 returning to the position shown in Fig. 4. It will be seen, therefore, that, as already described, a cycle of movement of the pinion back and forth peripherally of the side gears will take place for each revolution of the pinion, that is, that there will be a cycle of variation in leverage for each revolution of the pinion, to first increase the power applied to each side gear and then decrease it.

Figs. 9 to 11 inclusive illustrate a modification of the invention in which the cycle of variation in leverage occurs a plurality of times in a revolution of a pinion. Here a cam 60, which is of generally triangular shape in cross-section and whose sides are symmetrical with reference to an axis 61, is used instead of an eccentric hub portion. The active surface of this cam 60 is composed of circular arcs, and for convenience in construction, opposite arcs are made concentric to the same center but with different radii of curvature. Thus the arc $ab$ is curved about the same center $x$ as the arc $de$ but the radius of the arc $ab$ is much greater than the radius of the arc $de$. Likewise, the arc $bc$ is curved about the same center $y$ as the arc $ef$ but with a much smaller radius and the arc $cd$ is curved about the same center $z$ as the arc $fa$ but with a much greater radius.

The cam 60 is secured to a planet pinion with its center 61 coaxial with the axis of the pinion. The pinion is here denoted by its pitch circle 37′ and the two side gears with which it meshes are denoted by their pitch surfaces 31′ and 32′, respectively. The cam 60 engages in a slot in a differential housing which is similar to the slot 42 of the housing 20, and the side walls of this slot are denoted at 43′ and 44′, respectively. The sides of the cam 60 are conjugate to the side walls of this slot so as to permit swing of the pinion about the pinion apex.

In the position shown in Fig. 9, the cam portions $af$ and $cd$ which are concentric to the center $z$ are in engagement with the side walls 43′ and 44′ of the slot and the center of axis 61 of the pinion is below the center line 62 of the slot. This is one extreme position of the pinion axis 61. Fig. 10 shows another position where the pinion has rotated through an angle of 30° from the position shown in Fig. 9. Here the arcs $ef$ the $bc$, which are concentric to the center $y$, are just beginning engagement with the side walls of the slot. In this position, the pinion has been moved so that its center 61 lies on the center line 62 of the slot. Fig. 11 shows a position after the pinion has been turned further through an angle of 30° from the position shown in Fig. 10. Here the arcuate portions, which are curved about the center y are still in engagement with the side walls of the slot but the axis 61 of the pinion has moved to a position above the mean center line 62 of the slot. This is the other extreme position of the pinion axis and is half a cycle different from the position shown in Fig. 9. In this embodiment of the invention, then, there are three cycles of variation in leverage for each revolution of the planet pinion.

A further embodiment of the invention is illustrated in Figs. 12 to 16 inclusive which show specifically a two pinion differential. The differential housng is denoted at 70. It is formed with a flange 69 against which the rear axle drive gear (not shown) is secured. The bevel side gears of the differential are denoted at 71 and the bevel planet pinions at 72. Both gears and pinions are again of standard construction, each having teeth of uniform shape, uniformly spaced about their respective axes. The side gears are mounted coaxially to rotate about the axis 73 of the differential housing. The pinions 72 are also mounted coaxially but instead of being broached with round holes in the conventional manner, they are broached with square holes 74 (Figs. 13 to 16 inclusive). The square hole in each pinion is adapted to receive a cam-shaped portion 76 of a pin 75. The pin 75 carries a spaced block 77 that serves to hold the pinions and side gears in place. The pin is secured against rotation in the differential housing 70. This may be done by making the pin square, except for its cam portions 76, and broaching square holes in the differential housing to receive the pin.

Figure 13:
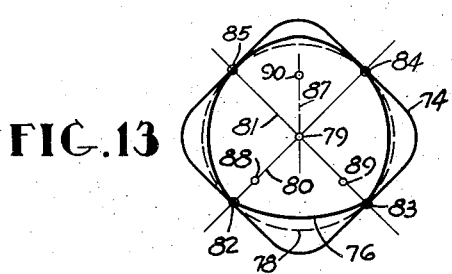

If the portions of the pin 75, which engage in the square holes of the pinions 72, were of cylindrical shape as indicated in dotted lines at 78 in Fig. 13, and the axis 79 of these cylindrical portions coincided with the axes of the pinions themselves, then the pinions would simply turn about the axis 79 as the pinions revolved. Since the portions 76 of the pin, which engage in the square holes 74 of the pinions, depart from cylindrical shape, as clearly shown in Fig. 13, the pinions will be displaced bodily back and forth about the axis 73 of the differential as the pinions revolve. It is this back and forth bodily displacement which produces the varying leverage effect.

In the form of pin 75 shown, each portion 76 is so shaped as to contact with all four sides of a square hole 74 in a pinion 72. Thus in Fig. 13 contact is made at points 82, 83, 84, and 85 on the normals 80 and 81 to the sides of the square hole. Near the points 82 and 83, the profile of the cam portion 76 of the pin is more curved than the circle 78 but midway between the points 82 and 83 the profile of the pin portion 76 is less curved than the circle. Diametrically opposite portion 84—85 of the pin is less curved than the circle 78 adjacent to the points 84 and 85 and more curved midway between these points.

Once the portions 82—83 and 84—85 have been established, the motion of the axis 79 of the pinion in a peripheral direction along the line 87 in a plane perpendicular to the axis 73 is determined. If continuous contact with all four sides of the square hole 74 is desired, the portions 85—82 and 83—84 of the pin profile are made conjugate to the plane sides of the hole, that is, they are made of such shape as may be enveloped by said plane sides during the given relative motion between pinion and pin. Their shape can be determined by layout or by computation.

In the embodiment illustrated, the portions 82—83 and 84—85 have been assumed to be made up of circular arcs. Adjacent points 82 and 83, the arcs of portion 82—83 are centered at 88 and 89, respectively, while the central portion of the surface 82—83 is a circular arc whose center is at 90. Likewise, adjacent points 84 and 85, the arcs of the portion 84—85 are centered at 88 and 89, respectively, and the middle of this portion is centered at 90. The invention is not limited, however, to the employment of pin portions which are made up of circular arcs.

Figure 14:
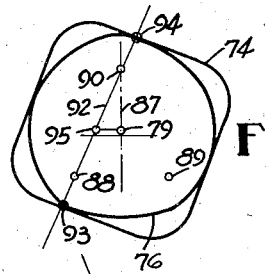

Fig. 14 shows the relative positions of the hole 74 and pin portion 76 after the pinion 72 has rotated through an angle of 22½° from the position shown in Fig. 13. In this figure, the contact shifts from one circular arc to another circular arc centered at 88 and 90, respectively. The connecting line 92 between the two centers 88 and 90 is then the normal at the points of contact 93 and 94. The instantaneous center of relative motion of the pinions with respect to the pin 75 must lie on this normal and inasmuch as the axis 79 of the pinion moves along the line 87, said instantaneous center must also lie on a line 79—95. It is the intersection 95 of the lines 93 and 79—95, which are normal to the points of contact and to the line of travel of the axis of the pinions, respectively. At the considered moment, the pinion moves as if turning about an eccentric axis passing through the point 95 and the apex 96 (Fig. 12) of the pinion.

Figure 15:
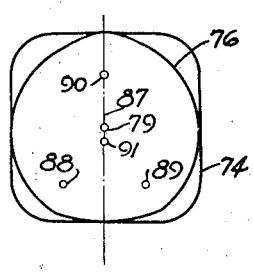
Figure 16:
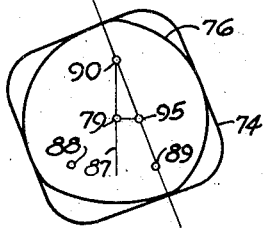

Fig. 15 shows a further position of the parts after the pinion has rotated through an angle of 22½° from the position shown in Fig. 14, and Fig. 16 shows the position where the pinion has rotated through an angle of 22½° from the position shown in Fig. 15. After another 22½° of rotation of the pinion, the position of the parts would be similar to that shown in Fig. 13 with the exception that the square hole 74 would have been rotated through 90°. In the position shown in Fig. 14 and in the position symmetrical thereto which is shown in Fig. 16, the instantaneous center of motion 95 has a maximum distance from the axis 79 of the pinion and gives the maximum variation of leverage. In Fig. 15, the axis 79 has a maximum distance from the center 91 about which the arc centers 88, 89, and 90 are spaced.

The embodiment of the invention shown in Figs. 12 to 16 inclusive is particularly suited for passenger cars. It will produce four cycles of variation in leverage per revolution of a planet pinion. The square holes through the pinions and through the differential housing 70 can be broached and may be burnished at about the same cost as the round holes on a standard differential. The pin 75 can also be broached and may then be milled on the portions engaging the square hole of the pinion and ground, after hardening, if desired.

While the invention has been described in connection with a bevel gear type differential, it will be understood that it is applicable also to other types of differentials as, for instance, spur gear differentials.

It will further be understood that while the invention has been described in connection with several different embodiments, it is capable of further modification and this application is intended to cover any variations, uses or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A differential mechanism comprising a rotatable housing, a pair of side gears journaled in said housing for rotation about the axis of the housing, pinions meshing with said side gears and disposed in said housing to rotate therewith, and means constraining each pinion to move back and forth relatively about the axis of the side gears as the pinion rotates on its axis comprising a guide slot and a control member movable therein, one of which is fixed relative to said housing and the other of which is fixed relative to the pinion, said control member being non-circular in cross-section and being of different cross-sectional shape from said slot.

2. A differential mechanism comprising a rotatable housing, a pair of side gears journaled in said housing for rotation about the axis of the housing, pinions meshing with said side gears and disposed in said housing to rotate therewith, and means constraining each pinion to move back and forth relatively about the axis of the side gears as the pinion rotates on its axis comprising a plane-sided slot and a non-circular cam-shaped control member which is movable therein, one of which is fixed relative to the housing and the other of which is fixed relative to the pinion, said control member being of different cross-sectional shape from said slot.

3. A differential mechanism comprising a rotatable housing, a pair of bevel side gears journaled in said housing for rotation about the axis of said housing, a bevel pinion mounted in said housing to rotate therewith and meshing with the two side gears, said side gears having uniformly shaped teeth, uniformly spaced about their axis and said pinion having uniformly shaped teeth, uniformly spaced about its axis, said pinion having a non-circular, cam-shaped projection formed thereon, and said housing having a slot formed therein in which said projection engages and which is of different cross-sectional shape from said projection, said slot having parallel sides and the center line of said slot lying in the same plane with the axis of the side gears.

4. A differential mechanism comprising a rotatable housing, a pair of bevel side gears journaled in said housing for rotation about the axis of the housing, a bevel pinion mounted in said housing to rotate therewith and meshing with the two side gears, said pinion having a bore therethrough, and a pin secured to said housing and having a non-circular cam-shaped portion engaging in the bore of the pinion.

5. A differential mechanism comprising a rotatable housing, a pair of bevel side gears journaled in said housing for rotation about the axis of the housing, a bevel pinion mounted in said housing to rotate therewith and meshing with the two side gears, said pinion having a non-circular bore therethrough, and a pin secured to said housing and having a cam-shaped portion engaging in the bore of the pinion which is of different cross-sectional shape from the cross-sectional shape of said bore.

6. A differential mechanism comprising a rotatable housing, a pair of bevel side gears journaled in said housing for rotation about the axis of the housing, a bevel pinion mounted in said housing to rotate therewith and meshing with the two side gears, said pinion having a plane-sided bore therethrough and a pin secured to said housing and having a portion, which is of non-circular cross-section and of different cross-sectional shape from said bore, engaging in said bore.

7. A differential mechanism comprising a rotatable housing, a pair of bevel side gears journaled in said housing for rotation about the axis of the housing, a bevel pinion mounted in said housing to rotate therewith and meshing with the two side gears, said pinion having a square hole therethrough and a pin secured to said housing and having a portion, which is of non-circular cross-section and of different cross-sectional shape from said bore, engaging in said bore.

ERNEST WILDHABER.